Nov. 6, 1928.  1,690,816
H. S. FOLKER
TRAIN CONTROL RESTORING APPARATUS
Filed Feb. 8, 1927 4 Sheets-Sheet 1
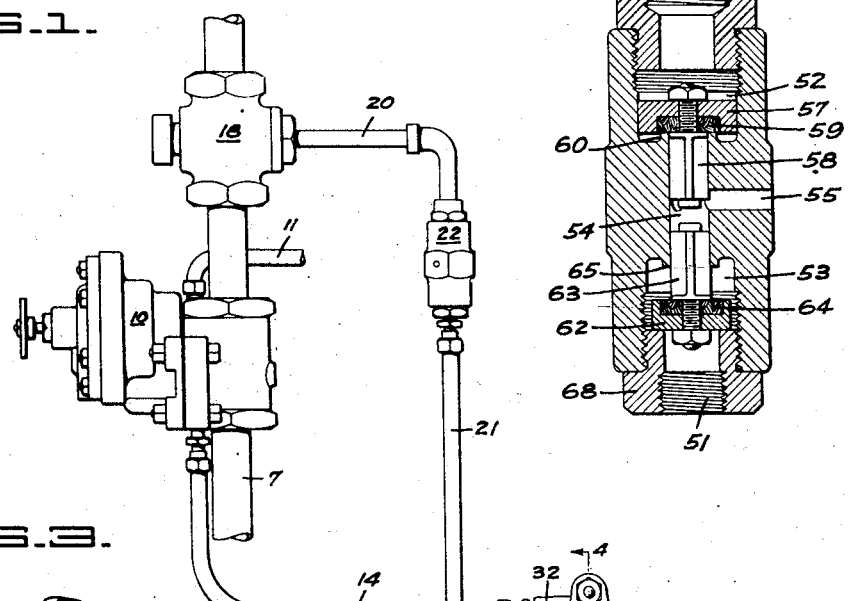
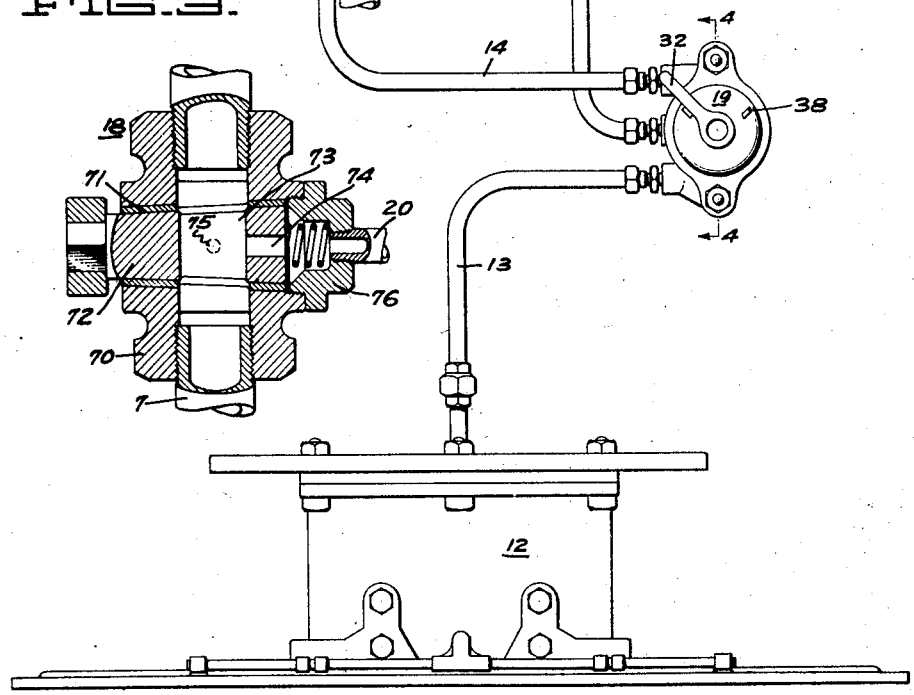
INVENTOR
Howard S. Folker
BY
ATTORNEYS Nov. 6, 1928.

H. S. FOLKER 1,690,816

TRAIN CONTROL RESTORING APPARATUS

Filed Feb. 8, 1927   4 Sheets-Sheet 2

INVENTOR
Howard S. Folker
BY White, Prost & Fryer
ATTORNEYS

Nov. 6, 1928.

H. S. FOLKER 1,690,816

TRAIN CONTROL RESTORING APPARATUS

Filed Feb. 8, 1927  4 Sheets-Sheet 3

INVENTOR
Howard S. Folker
BY
his ATTORNEYS

Nov. 6, 1928.

H. S. FOLKER 1,690,816

TRAIN CONTROL RESTORING APPARATUS

Filed Feb. 8, 1927    4 Sheets-Sheet 4

INVENTOR
Howard S. Folker
BY White, Prost, Fryer
his ATTORNEYS

Patented Nov. 6, 1928.

1,690,816

UNITED STATES PATENT OFFICE.

HOWARD S. FOLKER, OF MILL VALLEY, CALIFORNIA, ASSIGNOR TO NATIONAL SAFETY APPLIANCE COMPANY, OF RENO, NEVADA, A CORPORATION OF NEVADA.

TRAIN-CONTROL-RESTORING APPARATUS.

Application filed February 8, 1927. Serial No. 166,646.

This invention relates generally to automatic train control systems of the type which utilize pneumatic brake equipment and has special reference to restoring apparatus for such systems.

Pneumatic braking equipment of trains generally include a brake pipe adapted to be vented for effecting a brake application. For manual control of the train the brake pipe is connected with an engineer's brake valve while for automatic control there is provided an automatic brake-application device or train-stop valve which is actuated by a track condition to vent the brake pipe. During double heading operations it is the practice to put the brakes of a train under the control of one locomotive, as by rendering inoperable the brake control devices of the other locomotive. However, any cut-out device which may be provided for double heading must not be capable of defeating normal automatic control of the brakes when a locomotive is proceeding under its own control.

It is an object of this invention to coordinate the restoring mechanism of an automatic control system with the double heading cock or other mechanism provided for cutting out the engineer's brake valve so that the engineer must effect a partial or incomplete restoring operation before the control devices of a particular locomotive may be made inoperative to permit double heading.

It is a further object of this invention to combine the double heading cock of a pneumatic braking equipment with a device for restoring the automatic brake control to normal condition so that when the double heading cock is open to permit control of the train from the engineer's brake valve, movement of the device to restoring position will effect or continue a penalty brake application until the restoring device is returned to normal position, and closing of the cut-out cock will prevent a brake application while the device is in restoring position.

It is a further object of this invention to devise a novel form of restoring valve which will be rugged in construction and will obviate the use of plug cocks.

It is another object of this invention to devise a vent controlling or interlocking valve which may be readily connected to the existing double heading cock of a pneumatic brake equipment, and which when so connected, will permit venting of the pneumatic controlling connection of an automatic application valve when the double heading cock is open, and will prevent such venting when the cock is closed.

Further objects of this invention will appear from the following description in which I have set forth the preferred embodiment of my invention. It is to be understood that the invention is to be accorded a range of equivalents consistent with the state of the prior art.

Referring to the drawings:

Figure 1 is a diagram illustrating a train control system embodying the principles of this invention.

Fig. 2 is a transverse cross sectional detail showing the vent controlling or interlocking valve.

Fig. 3 is a transverse cross sectional detail of the usual double heading cock of a train braking equipment, showing the connections for the interlocking valve.

Figure 4:
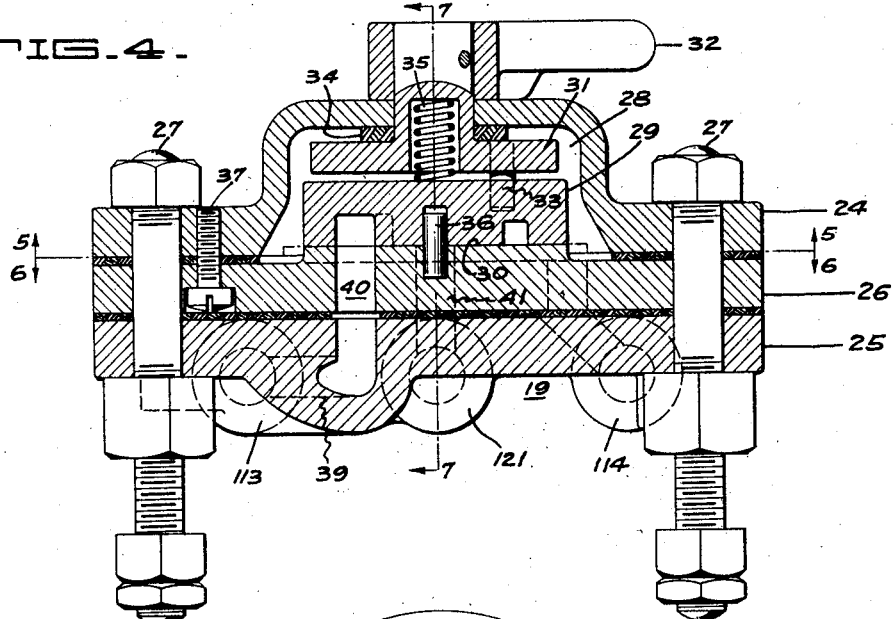
Fig. 4 is a transverse cross sectional view of the penalty restoring valve shown as incorporated with the system of Fig. 1.
Figure 5:
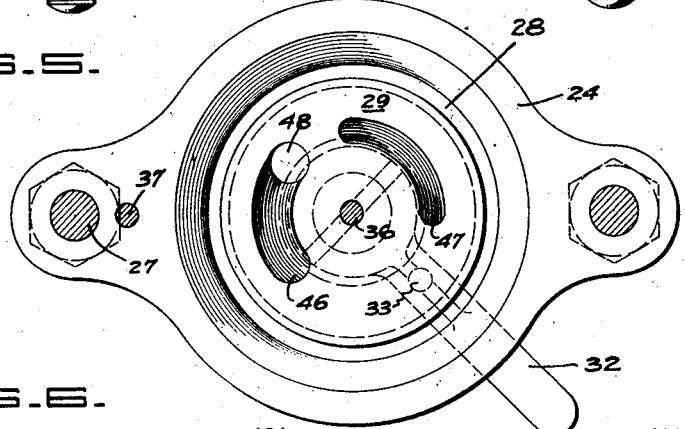
Fig. 5 is a cross sectional view taken along the line 5—5 of Fig. 4.
Figure 6:
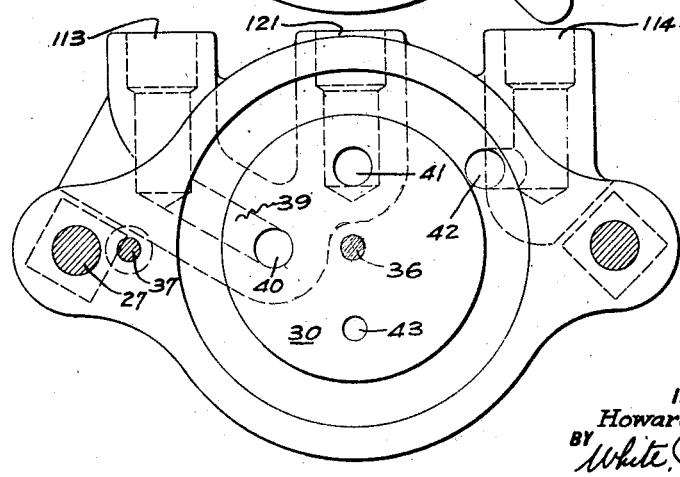
Fig. 6 is a cross sectional view taken along the line 6—6 of Fig. 4.

The invention in its preferred form is incorporated with a train control system of the type shown in Patent No. 1,439,081 issued Dec. 19, 1922 to H. S. Folker, and in certain respects the restoring apparatus herein described may be considered an improvement over the system described in this patent. It is obvious however, that certain features of the invention are sufficiently broad to be applicable to various other automatic train control systems.

Thus referring to Fig. 1 of the drawing, there is shown a train control system incorporating essentially an automatic application or train stop valve 10 which is connected to a brake pipe 7 of the ordinary pneumatic braking system on a train. Manual control of the train is secured by the usual engineer's brake valve which is also in communication with the brake pipe 7. The application valve 10 is connected to the main reservoir of the pneumatic braking equipment by means of pipe 11, and is constructed so as to automatically vent the brake pipe 7 upon venting of a pneumatic chamber. A control valve 12 is positioned at some suitable point upon the train so as to pass over suitable inductor devices positioned upon the track and this valve is connected to control pipe 13 which normally communicates with control pipe 14, this latter pipe connecting with the aforementioned chamber of the application valve 10. The inductor devices are controlled by the usual signal and track circuits so that when the train passes over an inductor device under clear track conditions, the control pipe 13 will not be vented, while under contrary conditions the control valve will be opened to vent the pipe 13. The application valve 10 has restricted communication with the main reservoir pipe 11 and is designed so that when it is actuated to venting condition by venting of control pipe 13, air from the main reservoir pipe 11 is continuously bleeded through the valve and through pipes 13 and 14. The control valve 12 is also constructed so that after it has been actuated to venting condition, it will continue to remain in this actuated condition until flow of air through the control pipe 14 is arrested.

Thus far described the system is essentially that disclosed in the Folker patent referred to above. In this patent I have also shown a suitable restoring device in the form of a release cock, having communication with both the control pipes 13 and 14 and the brake pipe 7. When moved from normal to restoring position after an automatic actuation, this release cock served to vent both the control pipe 13 and the brake pipe, thus continuing application of the brakes and permitting restoration of the control valve to normal condition. At the same time the cock in restoring position interrupted flow of air through the control pipe 14 of the automatic application valve, thus causing this valve to return to normal non-venting condition. Upon return of the release cock to normal position, venting of the brake pipe was discontinued with the result that the train was free to proceed. In order to render the control devices of one locomotive inoperable during double heading operations, the venting of the brake pipe in this prior system was secured by a connection between the usual double heading cock and the release cock so that with the release cock in restoring position and the cut-out or double heading cock closed, the brake pipe would not be vented, with the result that the train could proceed entirely under the control of another locomotive.

The chief difficulty with restoring apparatus such as described above has been that a continuation of a brake application while the release cock was in restoring position depended upon venting of the brake pipe through the double heading cock and the release cock. Because of the large capacity of the air compressors used on modern locomotives, venting in this manner may not be sufficient to maintain the pressure in the brake pipe below the desired value. Another difficulty has been with the mechanical construction of the release cock which has generally been in the form of a double plug cock. These cocks are difficult to keep free from leakage and because of the fit of the handle on the squared heads of the two plug cocks, have been subject to rapid wear due to vibration of the locomotive. In this invention however, a special form of restoring valve is employed which obviates the difficulties encountered in the use of a double plug cock, and which functions to maintain the automatic application valve in condition to vent the brake valve and thus continue a brake application when the restoring valve is in restoring position and the double heading cock is open. An engineer cannot prevent an automatic brake application by fastening the restoring valve in restoring position, as when this condition exists the application or stop valve is maintained in condition to vent the brake pipe. However, an interlocking device is employed between the double heading cock and the restoring valve which functions to permit restoring of the application valve to normal condition when the double heading cock is closed for double heading operation and the restoring valve is in restoring position. In the drawings the improved form of restoring valve 19 and the double heading cock 18 have been shown as connected with the interlocking device 22 through pipes 20 and 21.

The details of the restoring valve are shown in Figs. 4 to 7 inclusive. For convenience in manufacture, the body member of the valve is made in three parts comprising a pressure head 24, a flange connection 25 and an intermediate member 26, these members being secured together and to a suitable support by convenient means such as bolts 27. The pressure head 24 forms a sealed pressure chamber 28 inclosing a suitable valve member 29, which member operates upon a valve seat 30 carried by one face of the intermediate member 26. The valve member 29 is actuated by suitable means such as a crank disc 31 which is operatively connected to an external hand lever 32. The crank disc is connected with the valve member 29 by means of a pin 33 which is secured to the disc 31 and which extends into a hole or recess in the valve member 29, so that the valve member will be free to seat itself upon the valve seat 30. A sealing washer 34 is inserted between the crank disc 31 and the pressure head 24, and a compression spring 35 serves to press the crank disc against the sealing washer and to force the valve member tightly against its seat. In order to center the valve member there is provided a pin 36 extended into alined holes provided in the valve member and seat. In addition to the bolts 27 for securing together the parts of the body, screw 37 is provided for securing together intermediate member 26 and pressure head 24, so that these parts may be separately assembled with the crank disc, valve member and spring in operating position, and so that these parts may be removed as a unit from the connection flange for inspection or repair. Lugs 38 are provided upon the pressure head in order to limit movement of hand lever 32 to either normal or restoring position.

Figure 7:
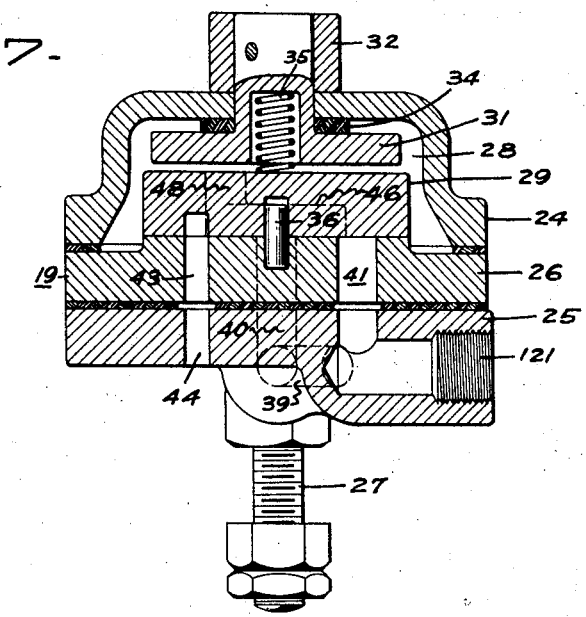
Fig. 7 is a cross sectional view taken along the line 7—7 of Fig. 4.

The various passages and ports in the restoring valve may be traced as follows: The passageway 113 in the connection flange 25, which normally is connected to the pipe 13 shown in Fig. 1, communicates with passageway 39 and a port 40 in the valve seat 30. Passageway 121 which normally connects with pipe 21, is in communication with a port 41 in the valve seat 30. Ports 40 and 41 are spaced apart circumferentially a distance between centers substantially equal to the limited arcuate movement of the valve member 29. Passageway 114 which connects with pipe 14, communicates with the pressure chamber 28 through passageway 42. The valve seat is also provided with a vent port 43 which communicates with the atmosphere through passageway 44 as shown in Fig. 7. Cooperating with the ports in the valve seat the valve member is provided with two elongated arcuate ports or recesses 46 and 47, one end of the port 46 being in communication with the pressure chamber 28 through passageway 48.

The relationship between the ports in the valve is such that when the valve is in normal position communication is established between passageways 113 and 114 through passageway 39, port 40, port 46, passageway 48, pressure chamber 28 and passageway 42. At the same time port 41 and therefore passageway 121 will be closed by the valve member 29. Assuming now that an automatic brake application has occurred by actuation of the control valve 12 and consequent venting of the control pipes 13 and 14, and it is desired to restore the braking system to normal condition. As has been previously explained, it is characteristic of the particular system shown that a continuous flow of air will occur through the control pipes 13 and 14 tending to keep the control valve open. When the restoring valve lever is moved to restoring position passageway 113 is vented to the atmosphere through passageway 39, port 40, port 47, port 43 and passageway 44. However, after initial movement of the valve lever and while the valve is in restoring position, communication will be established between passageways 114 and 121 through passageway 42, pressure chamber 28, passageway 48, and ports 46 and 41. Venting of pipe 13 and passageway 113 serves to permit closing or restoration of the control valve 12. If the pipe 21 or passageway 121 is continuously vented so as not to interrupt the flow of air through pipe 14, then the application valve 10 will continue in venting condition and will not be restored. However, if the pipe 21 is not vented, as by means of an interlocking device in connection with a double heading cock as will be presently described, then the application valve will be restored to normal or non-venting condition while the restoring valve is in restoring position. Assuming however that pipe 21 is being vented, it will then be obvious that with the lever 32 in restoring position a brake application will continue until the restoring operation is completed by returning the valve lever to normal position. This feature of continuing the brake application until a completed restoring operation is effected by the engineer, is for the purpose of making it impossible for the engineer to avoid an automatic brake application by fastening the restoring valve in restoring position during normal operation of the train; thus a penalty is imposed if improper use of the restoring valve is attempted. When the restoring valve is moved to normal position, the control valve 12 having previously been restored to closed position, pressure will now build up in the control pipes 13 and 14 to cause the train stop valve 10 to be restored to normal non-venting condition. In practice the port 46 is made sufficiently long that it establishes communication between port 41 and the pressure chamber 28 before communication is interrupted between port 40 and the pressure chamber, so that either one of the passages 113 or 121 is always in communication with the pressure chamber. Thus the pipe 14 cannot at any time be cut off from communication with both pipes 13 and 21.

The double heading cock together with the interlocking valve serves to control venting of the pipe 21 while the restoring valve is in restoring position. The interlocking valve 22 consists of a body member having passageways 50 and 51 for connection with pipes 20 and 21 respectively. Within the body of the valve there is formed a piston chamber or cylinder 52, a valve chamber 53, and an intermediate venting chamber 54 which is in communication with the atmosphere through vents 55. Within the chambers 52 and 53 are disposed movable members which permit venting of passageway 51 when a substantial air pressure exists in passageway 50 but which interrupt venting of passageway 51 when the pressure in passageway 50 is reduced. Thus disposed within the piston chamber 52 there is a piston 57 which is guided by means of a fluted stem 58 extending into the venting chamber 54. As the piston is adapted to freely reciprocate within the chamber 52, packing between the piston and chamber walls is obviated by providing a packing washer 59 upon the outer face of the piston, which in one position of the piston is adapted to contact with the seat 60, and because of air pressure upon the piston 57, to be pressed upon this seat to prevent escape of air from chamber 52 to the venting chamber 54. In the chamber 53 there is likewise a movable valve member 62 secured to a protruding stem 63 which is guided within the venting chamber 54. The valve member is provided with a packing washer 64 adapted to contact with the valve seat 65. Preferably the piston 57 is biased in a direction to interrupt communication between chamber 52 and venting chamber 54, and valve member 62 is biased in a direction to establish communication between valve chamber 53 and venting chamber 54, this biasing being secured in the present instance by positioning the valve in vertical position so that gravity causes these members to be biased in the desired direction. A relatively loose fit is provided between the valve member 62 and chamber 53 so that passageway 51 may be vented to the venting chamber 54 when the valve member is not in the upper limit of its movement. The piston and valve members are shown as being retained within their respective chambers by means of hollow plugs 67 and 68 respectively to which the pipes 20 and 21 are connected. The fluted stems form a lost motion connection between the piston 57 and valve member 62 so that when the piston is forced against its seat, the valve 62 is held in venting position.

The usual double heading cock of an air braking equipment consists of a plug cock, such as shown in Fig. 3, which comprises a body member 70 having a tapered seat 71 within which is fitted a rotatable plug 72. The plug 72 is provided with the usual passageway 73 which permits flow of air through the brake pipe in one position of the plug and interrupts flow when the plug is in closed position. To provide for connecting the pipe 20 to the double heading cock, the construction of the cock is modified by providing a passageway 74 in one end of the plug to communicate with the passageway 73, and by providing a venting port 75 in the body 70 which communicates with the atmosphere. A passageway is also provided in the cap 76, to which pipe 20 is connected, so that this pipe will normally communicate with passageway 74. When the double heading cock is open the pipe 20 will therefore be in direct communication with the brake pipe, while when the double heading valve is closed pipe 20 will be vented to the atmosphere through port 75.

The interlocking valve operates as follows: On an engine having control of the brakes and therefore having double heading cock 18 open, pipe 20 will be in communication with the brake pipe and therefore brake pipe pressure will force the piston 57 tightly against its seat. After the stop valve 10 has been automatically actuated to apply the brakes and the train has been stopped, the engineer in order to restore the automatic control device and thus permit release of the brake, moves the restoring valve lever 32 to restoring position. In this position of the restoring valve control pipe 13 is vented, thus permitting closing of the control valve 12 while control pipe 14 from the train stop valve is placed in communication with pipe 21 which connects to interlocking valve 22. As valve member 62 normally covers passageway 51, the continuous flow of air through control pipe 14 from the stop valve is sufficient to force the valve member 62 upwardly until the stem 63 contacts with stem 58. In this position of the valve member 62 the pipe 21 will be continuously vented through ports 55, thus causing the train stop valve to remain in brake pipe venting condition. When the restoring valve lever 32 is returned to normal position, or in other words, when a completed restoring operation has been effected, pressure will build up in control pipes 13 and 14 and cause the train stop valve to be restored to non-venting condition.

When the brakes are not under control of the locomotive, as when they are controlled from another locomotive during double heading operation, the double heading cock 18 is closed and pipe 20 is vented to the atmosphere through port 75. However, merely closing the double heading cock 18 is not sufficient to prevent operation of the train stop valve 10, as it is also necessary to effect a partial restoring operation of the restoring valve 19. Therefore the engineer must also move the lever 32 of the restoring valve to restoring position, thus establishing communication between the control pipe 14 and pipe 21 connected to the interlocking valve. Practically simultaneously with this operation flow of air through pipes 14 and 21 causes valve member 62 to be moved to its seat, carrying with it the piston member 57 after the stems 63 and 58 abut. Thus communication between the chamber 53 and venting chamber 54 is interrupted so that pressure is maintained in the control pipe 14 to keep the stop valve in non-venting condition. If it is desired to again place the brakes under the control of the locomotive the engineer first returns the lever 32 of the restoring valve to normal position and then opens the double heading cock 18. Opening of the double heading cock again places pipe 20 in communication with the brake pipe, thus causing the piston 57 to be forced downwardly to unseat the valve member 62. If the engineer opens the double heading cock 18 without first returning the restoring valve to normal position a penalty application of the brakes will result since the control pipe 14 of the stop valve will be vented through pipe 21 and the interlocking valve. In practice the effective area of the piston 57 is made substantially greater than the effective area of the valve member 62 when the valve member is in contact with the seat 65, so that the piston will be effective to unseat the valve member even when the pressures in pipes 20 and 21 are substantially equal.

In some instances it may be desirable to use the restoring valve for restoring purposes only. In this case since the valve is not to be left in restoring position during double heading operations, port or recess 46 may be of sufficient length to communicate with both ports 40 and 41 when valve 19 is in restoring position, and passageway 121 will form a direct vent to the atmosphere. Movement of the valve to restoring position will then permit a free flow of air from pipes 13 and 14 to the atmosphere. Venting of pipe 13 is desirable in order to prevent a tapering off of air flow through the control valve, and causes immediate restoration of that valve. Continued venting of pipe 14 keeps the train stop valve in application position until the restoring valve is returned to normal position. When the restoring valve is not to be used with the interlocking valve, vent port 43 and port or recess 47 may therefore be dispensed with since pipes 13 and 14 may be adequately vented through passageway 121. However, when an interlocking valve is connected to passageway 121 it is preferable to provide vent port 43 and recess 47, as flow of air from pipe 14 through the slight resistance of pipe 21 and the interlocking valve would tend to prevent effective venting of pipe 13 through the same channel.

Figure 10:
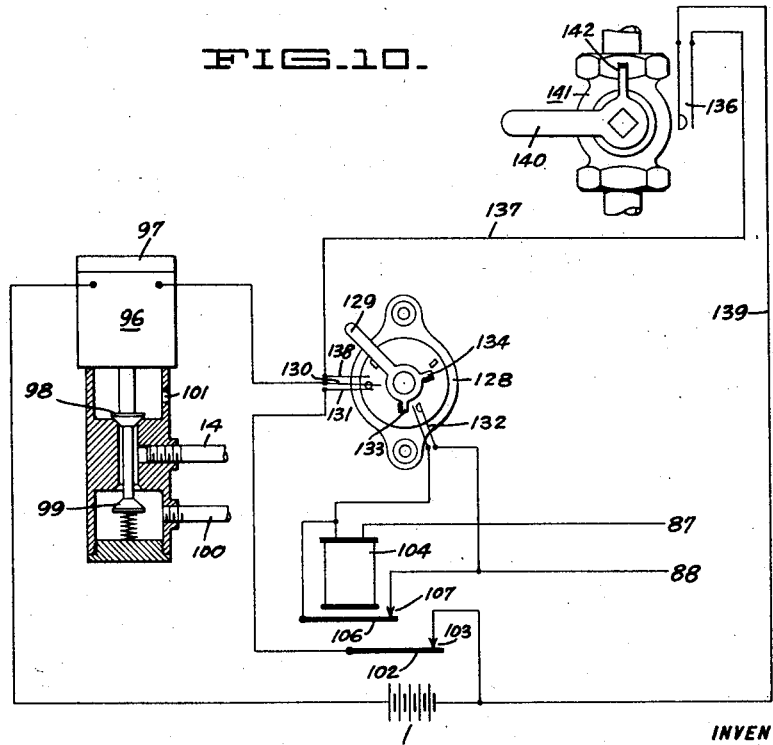
Fig. 10 illustrates a further modification of the system of Figs. 8 and 9 in which electrical restoring and double-heading control means are employed.
Figure 8:
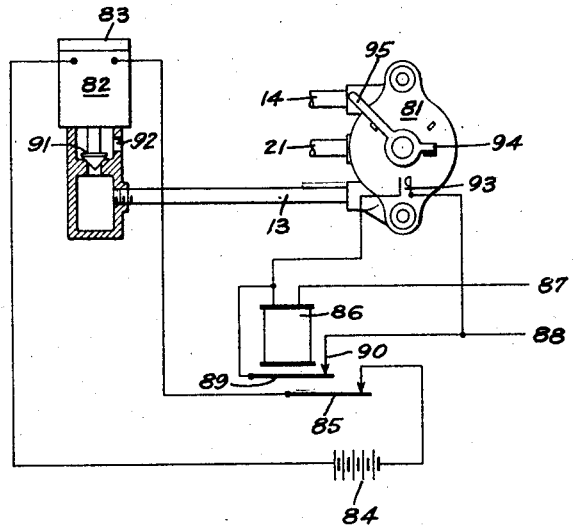
Fig. 8 is a diagram illustrating a modified form of the system shown in Fig. 1, in which modification an electromagnetic control is employed for effecting automatic movement of the train stop valve.
Figure 9:
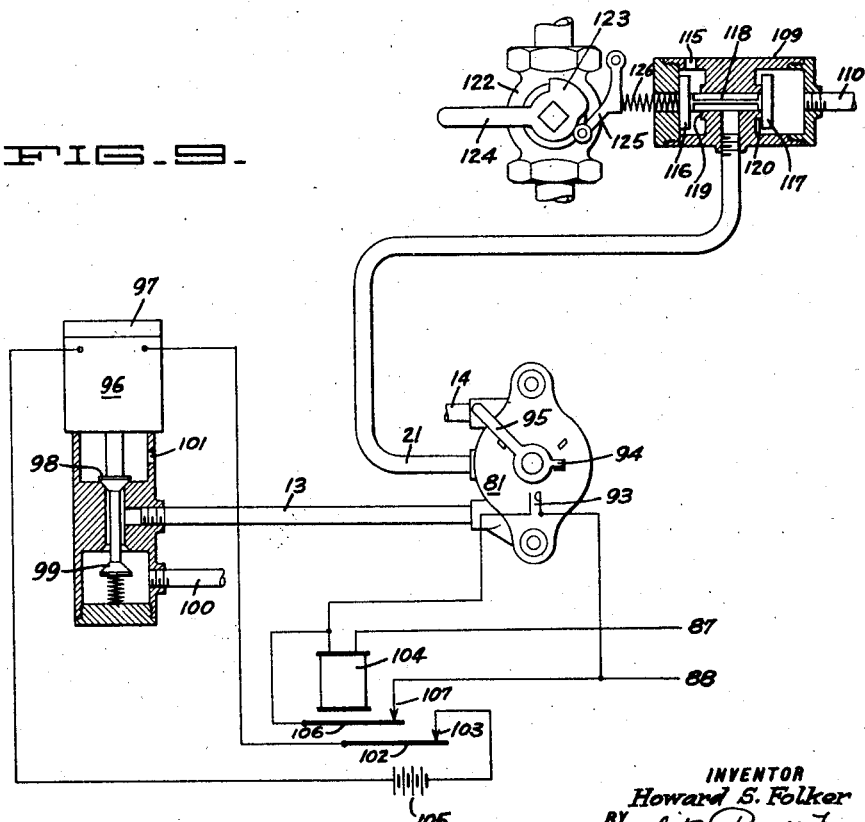
Fig. 9 illustrates a modification of a system illustrated in Fig. 8 in which the controlling valves supply air to, as well as vent it from, the train stop valve, and the interlocking valve is replaced by a double-acting valve provided with a direct mechanical connection to the double heading cock.

In Figs. 8 to 10 inclusive I have illustrated how certain features of this invention may be applied to train control systems making use of electrical circuits for controlling the automatic brake application valve or mechanism. In Fig. 8 an automatic brake application is secured by means actuated by reduction of pressure due to venting a chamber the supply to which is restricted, as in the case of the train stop valve 10 described with reference to the system of Fig. 1, which means has its control pipe 14 connected with a restoring valve 81. The control pipe 13 instead of connecting to the control valve 12 as in the system described above, is connected with a magnetic control valve indicated generally at 82. The electromagnet 83 of this valve is normally energized by a circuit including battery 84 and the armature 85 of a stick relay 86. The relay 86 is controlled by a circuit controlling receiving device, or by another relay on the locomotive, through wires 87 and 88 which form a closed circuit with the circuit controlling device through the windings of the relay 86, armature 89 and stick contact 90. When the controlling circuit including wires 87 and 88 is opened, relay 86 is deenergized to release armatures 85 and 89 with the result that the magnet 83 of the valve 82 is deenergized to permit movement of valve member 91 to vent the pipe 13 through port 92. As pipes 13 and 14 are normally in communication venting of pipe 13 causes the brake application means to vent the brake pipe and thus effect an automatic brake application. In order to permit closing of the circuit which normally energizes magnet 83, contacts 93 are connected in shunt with the stick contact 90 and its associated armature 89. These contacts 93 are engaged by a lug 94 carried by the restoring valve lever 95 so that when this lever is moved to restoring position contacts 93 are closed to provide a shunt path around stick contact 90 and its armature, thus permitting the relay 86 to be energized through the circuit including wires 87 and 88. Relay 86 will then pick up its armatures and reenergize magnet 83 to prevent further venting of the control pipe 13. In this instance the restoring valve 81 is similar to the restoring valve 19 described with reference to Fig. 1 with the exception of the addition of contacts 93 and the lug 94. For double heading operation connection is made by means of pipe 21, to an interlocking valve controlled by the double heading cock as in Fig. 1. Since the valve 82 is usually adapted to close upon closing of its circuit, irrespective of air flow, then port 43 and port 47 in the restoring valve may be omitted.

In Fig. 9 there is shown a restoring and double heading apparatus which is especially adapted for use with a brake application mechanism having a control pipe adapted to be connected to a source of air under pressure in order to maintain the mechanism in normal non-venting condition. With an application device of this type, during double heading operations it is not sufficient to merely prevent venting of the control pipe, but this pipe must be connected to an alternative source of pressure. Thus there is shown a restoring valve 81 similar to the restoring valve described with reference to the system of Fig. 8, the control pipe 14 of this valve being connected to the automatic application device, while control pipe 13 is connected to a double acting electromagnetic control valve 96. This control valve includes an electromagnet 97 adapted to actuate a pair of valves 98 and 99. The valve 96 also communicates with the main reservoir of the brake equipment or some other suitable source of air under pressure, through the pipe 100. When the valve 99 is closed and valve 98 open, pipe 13 is vented through port 101, while when valve 98 is closed and the valve 99 is open, pipe 13 is placed in communication with pipe 100 and therefore with the main reservoir pressure. The circuit for the magnet 97 is normally completed through armature 102 and contact 103 of a stick relay 104, and through battery 105. As in the case of the system described with reference to Fig. 8, the controlling circuit for the relay 104 is completed through wires 87 and 88 and armature 106 and stick contact 107 of the relay. Armature 106 and stick contact 107 are also shunted by normally open spring contacts 93 which are closed when the restoring valve lever 95 is moved to restoring position. In this system the valve 109 differs from the interlocking valve 22 described with reference to Fig. 1, in that it is double acting and a positive mechanical connection is provided between the valve and the double heading valve, instead of a pneumatic connection. This valve also has a pipe 110 connected to the main reservoir so that during double heading operations when the restoring valve is in restoring position, pipe 21, and therefore the control pipe 14, may be subjected to main reservoir pressure and the application device maintained in normal condition. The valve 109 may be of any suitable construction which will serve to interrupt communication between pipes 110 and 21, and vent pipe 21 when the double heading cock is open, and which will establish communication between pipes 110 and 21 when the double heading cock is closed. For example, there may be provided a pair of valve members 116 and 117 interconnected by a fluted stem 118. Valve member 116 is adapted to contact with seat 119 so as to interrupt communication between pipe 21 and the venting port 115. Likewise valve member 117 is adapted to contact with valve seat 120 to interrupt communication between pipes 110 and 21. The valve members are actuated upon movement of the double heading cock 122 by suitable mechanism such as a cam surface 123 movable with the handle 124, the cam surface engaging a pivoted lever 125 which is connected to valve member 116 as by a spring 126. The cam surface 123 is so shaped that when the double heading cock is in open position as shown in the drawings, the air pressure from pipe 110 will be sufficient to force valve member 117 against its seat, thus interrupting communication between this pipe and pipe 21. At the same time however, communication will be established between pipe 21 and the atmosphere through venting port 115. When the double heading cock is moved to closed position, the spring 126 is compressed to force valve member 117 off its seat 120 and to force valve member 116 against its seat, thus establishing communication between pipes 110 and 21.

In operating the system of Fig. 9, when the control circuit including wires 87 and 88 is opened, stick relay 104 is deenergized to release armatures 102 and 106. Magnet 97 will thereupon be deenergized to cause valve 99 to close and valve 98 to open. Communication between pipe 13 and the main reservoir through pipe connection 100, will thereupon be interrupted and pipe 13 will be vented through port 101. Since pipes 13 and 14 are in communication when the restoring valve is in normal position, the automatic application device will be actuated to vent the brake pipe and cause a brake application. Assuming that the double heading cock 122 is open, if it is desired to restore the system the restoring valve 81 is moved to restoring position to close contacts 93. Relay 104 may then be reenergized by the control circuit to pick up armatures 106 and 102, thus reenergizing magnet 97 to close valve 98 and open valve 99. As long as the restoring valve is in restoring position an automatic brake application will continue since control pipe 14 will be vented through pipe 21 and port 115 of valve 109. When the restoring valve is returned to normal position communication between pipes 13 and 14 will be reestablished and the application device will be subjected again to the main reservoir pressure through pipe 100 and valve 99. During double heading operation the double heading cock 122 is moved to closed position and the restoring valve 81 is moved to restoring position. As the valve member 117 will now be out of contact with its seat, the application device will be subjected to main reservoir pressure to prevent brake application since pipes 14 and 21 will be in communication with pipe 110.

In Fig. 10 there is shown a system which is similar to that described with reference to Fig. 9, in that a double acting electromagnetic control valve is employed for connecting the control pipe of the application device to the main reservoir in order to maintain the application device in non-venting condition. In this instance however, instead of employing a restoring valve, there is shown a restoring switch which obtains a penalty brake application when in restoring position, by opening the circuit to the electromagnet 97 of the control valve 96. This system also dispenses with the use of an interlocking valve by providing an electrical circuit controlled by movement of the double heading cock for reestablishing the energizing circuit for the magnet 97 during double heading operations. Thus the restoring device 128 is in the form of an electrical switch having a hand lever 129 movable to either normal or restoring position. Spring contacts 130 and 131 of this switch are normally closed and are inserted in series with the energizing circuit of magnet 97. The armature 106 and contact 107 of the stick relay 104 are shunted by the spring contacts 132 which are normally open. When the restoring lever 129 is moved to restoring position a lug 133 movable with this lever engages spring contact 130 to open contacts 130 and 131, thus deenergizing the magnet 97. At the same time contacts 132 are engaged and closed by a similar lug 134 in order to shunt armature 106 and stick contact 107 to permit restoring of the stick relay 104. The maintaining circuit for double heading operation includes the spring contacts 136 one of which is connected by means of wire 137 to the spring contact 138 which is cooperatively disposed with respect to spring contact 130, while the other spring contact 136 is connected by means of wire 139 to one side of the battery 105. When the lever 140 of the double heading cock 141 is moved to closed position, a lug 142 movable with this lever engages and closes spring contacts 136. When the lever 129 is also in restoring position, contacts 130 and 138 are closed, with the result that these contacts together with closed contacts 136 reestablish the energizing circuit for magnet 97 from the battery 105. Therefore during double heading operations the control pipe 14 of the brake application device will be subject to main reservoir pressure through pipe 100 and the device will be maintained in non-application condition.

It is apparent from the above disclosure that the invention is capable of being embodied in a number of different mechanical forms. Other well known types of pneumatic valves may be substituted for the rotary restoring valve disclosed and the restoring switch may be constructed to suit particular requirements. The particular form of interlocking valve disclosed is to be preferred since it may be readily incorporated with a standard double heading cut-out cock, as the necessary changes in the cock may be made without material alterations. The details of the interlocking valve may be varied within the scope of this invention, as for example, by the substitution of a diaphragm for the piston member 57.

I claim:

1. In combination with a pneumatic braking equipment of a train, said equipment having an engineer's brake valve for manually controlling the brakes, automatic means for effecting a brake application, means for rendering said brake valve ineffective to control the brakes, separately operable means for rendering said automatic means inoperable to effect a brake application, and means for rendering said third named means effective only while said brake valve is maintained ineffective by said second named means.

2. In combination with the pneumatic braking equipment of a train, said equipment having a brake pipe adapted to be vented to apply the brakes and an engineer's brake valve connected to said pipe, an automatic brake application mechanism adapted to vent the brake pipe, means for controlling said mechanism in response to a track condition, penalty means normally requiring a complete restoring operation for returning said mechanism to normal non-venting condition after being automatically actuated, means for rendering the engineer's brake valve ineffective to control the brakes, and means for rendering said mechanism ineffective to vent the brake pipe after the engineer's brake valve has been rendered inoperative and an incomplete restoring operation of the penalty means has been effected.

3. In combination with the pneumatic braking equipment of a train, said equipment having a brake pipe adapted to be vented to apply the brakes, an automatic brake-application mechanism adapted to vent the brake pipe, means for controlling said mechanism in response to a track condition, penalty means normally requiring a completed restoring operation for returning said mechanism to normal non-venting condition after an automatic actuation, and means effective to render said mechanism inoperable to vent the brake pipe, said last named means being effective only after an incomplete restoring operation of the penalty means has been made.

4. In combination with the pneumatic braking equipment of a train, said equipment having a brake pipe adapted to be vented to apply the brakes, an automatic brake-application mechanism adapted to vent the brake pipe in response to a track condition, a penalty restoring valve requiring a completed restoring operation for returning said mechanism to normal non-venting condition after an automatic actuation, and means effective only after an incomplete restoring operation of the penalty valve has been made for rendering said mechanism inoperable to vent the brake pipe.

5. In combination with a pneumatic brake control system having a brake pipe adapted to be vented to apply the brakes and an engineer's brake valve communicating with said brake pipe, an automatic brake-application mechanism for venting said brake pipe, means for automatically controlling said mechanism in response to a track condition, penalty restoring means including a member movable to restore said mechanism to normal non-venting condition after said mechanism has been automatically actuated to vent the brake pipe, said penalty means serving to retain said mechanism in venting condition until movement of said member has been completed, means for rendering said engineer's brake valve inoperative, and interlocking means for rendering said mechanism inoperable to vent the brake pipe after the engineer's brake valve has been rendered inoperative and an incomplete movement of said movable member has been effected.

6. In an automatic train-control apparatus, in combination with a brake pipe adapted to be vented for effecting a brake application, an engineer's brake valve associated with said brake pipe and a double heading cock for interrupting communication between the engineer's brake valve and the brake pipe, an automatic brake-application mechanism also associated with said brake pipe, said mechanism having a chamber adapted to be vented for causing it to vent the brake pipe, automatically actuated means for causing the venting of said chamber, means for preventing the automatic venting of said chamber, said means being adapted to impose a penalty for operation thereof while the double-heading cock is open by then venting said chamber, and means operable automatically upon closing of said double heading cock for nullifying said penalty, said last-named means being operative by controlling the pressure in said chamber.

7. An automatic train control apparatus for use with pneumatic braking equipment having an engineer's brake valve and double heading means for rendering said valve inoperative to control the brakes, comprising an automatic brake-application mechanism, a controlling device for said mechanism adapted to continue in actuated condition after an actuation, penalty means for restoring said controlling device to normal condition, means for rendering said controlling device ineffective to cause operation of said mechanism and for placing said mechanism under control of an additional controlling device when said restoring means is in restoring condition, and means associated with the double-heading means whereby said additional controlling device is made ineffective to cause operation of said mechanism when said engineer's brake valve is rendered inoperative.

8. In automatic train control apparatus including automatic brake application mechanism and a controlling device therefor adapted to continue in actuated condition after an actuation, means for restoring said controlling device to normal condition, means for rendering said controlling device ineffective to cause operation of said brake application mechanism and for placing said mechanism under control of an additional controlling device when said restoring means is in restoring condition, and means associated with the double heading cut-out cock of the air brake equipment whereby said additional controlling device is made effective to cause operation of said mechanism when said cock is open and ineffective to cause said operation when said cock is closed.

9. In automatic train control apparatus including a controlling device for varying the air pressure in a pneumatic connection, and automatic brake application mechanism normally retained in non-application condition by pressure maintained in said pneumatic connection and operated to brake applying condition upon reduction of pressure in said connection, said controlling device being adapted to continue in actuated condition after an actuation, an additional connection, an additional controlling device, means for restoring said first named controlling device to normal condition, means effective upon operation of said restoring means to restoring condition for closing communication through the pneumatic connection between the brake application mechanism and said first-named controlling device and for opening communication through said connection and said additional connection between said mechanism and said additional controlling device, and means associated with the double heading cut-out cock of the air brake equipment whereby said additional controlling device is made effective to prevent maintenance of pressure in said connections when said cock is open and effective to permit maintenance of pressure therein when said cock is closed.

10. A valve comprising a chamber inclosing a valve seat and movable valve member, said chamber being in communication with an external connection; operating means for said valve member; said valve seat being provided with first and second ports adapted for communication with external connections and being also provided with a port to atmosphere; said valve member being provided with a passageway whereby, in one extreme position of said member, communication is established between said chamber and the first port in said valve seat, in a second extreme position communication is established between said chamber and the second port in said valve seat, and in transit of said valve member between extreme positions communication is established between said chamber and both said first and second ports; said valve member being also provided with a passageway whereby, in its aforesaid second extreme position, communication is established between the first and the atmospheric ports in said valve seat.

11. A restoring valve for automatic train control apparatus, interposed in the pneumatic connection between an automatic brake application mechanism and the controlling device therefor, comprising, a chamber inclosing a valve seat and movable valve member, said chamber being in communication with the connection to said brake application mechanism; an operating member for said valve member movable between normal and restoring positions; said valve seat being provided with a first port in communication with the connection to said controlling device and a second port to atmosphere; said valve member being provided with a passageway whereby, in the normal position of said member, communication is established between said chamber and said first port and whereby, when said member is moved to restoring position, communication is established between said chamber and said first and second ports.

12. A restoring valve for automatic train control apparatus, interposed in the pneumatic connection between an automatic brake application mechanism and the controlling device therefor, comprising, a chamber inclosing a valve seat and movable valve member, said chamber being in communication with the connection to said brake application mechanism; an operating member for said valve member movable between normal and restoring positions; said valve seat being provided with a first port in communication with the connection to said controlling device, a second port in communication with a connection to a secondary controlling device, and a third port to atmosphere; said valve member being provided with a passageway whereby, in the normal position of said member, communication is established between said chamber and said first port, in restoring position communication is established between said chamber and said second port, and in transit of said valve member between normal and restoring positions communication is established between said chamber and said first and second ports; said valve member being also provided with a passageway whereby, in its restoring position, communication is established between said first and third ports.

13. In an automatic train control system, an interlocking means comprising a body member having two inlet passages and a discharge port, a member movable in response to air pressure in one passageway to interrupt communication between that passageway and said port but permitting venting of said one passageway through the port until shifted to the limit of its movement, a second member movable in response to air pressure in the other passageway to engage said first member and retain the same in venting position.

14. In an automatic train control system, an interlocking means comprising a body member having two inlet passages and a discharge port, a member movable in response to air pressure in one passageway to interrupt communication between that passageway and said port but permitting venting of said one passageway through the port until shifted to the limit of its movement, a second member movable in response to air pressure in the other passageway and a lost motion connection between said members whereby said second member may retain the first member in position to vent the one passageway.

15. An interlocking valve comprising a body member having a chamber with connection for admission of fluid under pressure, a valve chamber with a port for admission of fluid under pressure and a valve seat, and a vent through said valve seat; a controlling means adapted to reciprocate in said first named chamber, a valve member in said valve chamber adapted to be moved toward said valve seat by fluid under pressure entering through said admission port, and means whereby, when said controlling means is subjected to fluid pressure admitted to said first named chamber, the valve member is permitted only partial movement toward the valve seat and when previously seated is moved and held away from said seat to permit flow of fluid through said vent, and whereby, when the controlling means is relieved of pressure, the valve member is free to be moved against the valve seat to prevent flow of fluid through the vent.

16. An interlocking valve comprising a body member within which are, a chamber with connection for admission of fluid under pressure, a valve chamber with a port for admission of fluid under pressure and a valve seat, and a vent through said valve seat; a valve member in said valve chamber adapted to be moved toward said valve seat by fluid under pressure entering through said admission port, a controlling member of greater area than said valve member and adapted to reciprocate in said first-named chamber, and means whereby, in the absence of fluid pressure acting upon said controlling member, the valve member is free to be moved against the valve seat to prevent flow of fluid through said vent, and whereby, when fluid pressure admitted to said first named chamber acts upon the said greater area of the controlling member, the valve member is prevented from being moved against the valve seat and when previously seated is moved and held away from said seat against equal pressure in said valve chamber, to permit flow of fluid through said vent.

17. An interlocking valve comprising a body member within which are, a cylinder with connection for admission of fluid under pressure at its outer end and a seat at its inner end, a valve chamber with a port for admission of fluid under pressure at its outer end and a valve seat at its inner end, and an intermediate venting chamber; a valve within said valve chamber, a piston of greater area than said valve and adapted to reciprocate freely in said cylinder and to seal the cylinder against escape of fluid by contacting with said cylinder seat when the piston is subjected to fluid pressure acting upon its outer face, said valve being biased to cover the admission port of said valve chamber so as to be moved toward said valve seat by fluid under pressure entering through said port, and means mechanically interconnecting said piston and said valve so that, in the absence of fluid pressure acting upon the outer face of the piston, the valve may be moved against the valve seat by fluid under pressure entering at the admission port, thereby preventing flow of fluid from the valve chamber to the venting chamber, and that pressure acting upon the said greater area of the piston will move and hold the valve away from the valve seat against equal pressure in the valve chamber, but will not hold the valve against the admission port, thereby permitting flow of fluid from the valve chamber to the venting chamber.

18. In automatic train control apparatus including a primary controlling device for varying the air pressure in a primary pneumatic connection, and automatic brake application mechanism normally retained in non-application condition by pressure maintained in said primary connection and operated to brake applying condition upon reduction of pressure in said connection, said controlling device being adapted to be maintained in actuated condition by continuing flow of air therethrough; restoring and double heading appliances including a restoring device and a secondary controlling device, said restoring device being interposed in and normally permitting communication through said primary connection between said mechanism and said primary device, and having a secondary pneumatic connection with said secondary device, said restoring device comprising, an operating member movable between normal and restoring positions, and valve means for interrupting flow of air through said primary device upon movement of said operating member to restoring position and for opening communication through said primary and secondary connections between the brake application mechanism and the secondary controlling device when said member is in other than normal position and for closing communication through said primary connection between said mechanism and said primary device when said member is in restoring position, said secondary controlling device being connected with the double heading cut-out cock of the air brake equipment, and comprising means operable upon movement of said cock so as to be effective to prevent maintenance of pressure in said secondary connection when said cock is open and effective to permit maintenance of pressure therein when said cock is closed.

19. In automatic train control apparatus including a primary controlling device for varying the air pressure in a primary pneumatic connection, and automatic brake application mechanism normally retained in non-application condition by pressure maintained in said primary connection and operated to brake applying condition upon reduction of pressure in said connection, said controlling device being adapted to be maintained in actuated condition by continuing flow of air therethrough; restoring and double heading appliances including a restoring device and a modified double heading cut-out cock of the air brake equipment and a secondary controlling device, said restoring device being interposed in and normally permitting communication through said primary connection between said mechanism and said primary device, and having a secondary pneumatic connection with said secondary device, said restoring device comprising an operating member movable between normal and restoring positions, and valve means for interrupting flow of air through said primary device upon movement of said operating member to restoring position and for opening communication through said primary and secondary connections between the brake application mechanism and the secondary controlling device when said member is in other than normal position and for closing communication through said primary connection between said mechanism and said primary device when said member is in restoring position, said cut-out cock being provided with a passageway from the exterior to the main passageway in the rotatable plug and with a venting passageway adapted to communicate with said main passageway only when said plug is in cut-out position, said secondary controlling device being pneumatically connected with the first-named passageway in said cut-out cock, and comprising means controllable by air under pressure derived from the brake pipe through said passageway so as to be effective to prevent maintenance of pressure in said secondary connection when said cock is open and effective to permit maintenance of pressure therein when said cock is closed.

20. In combination with the pneumatic braking equipment of a train, said equipment having a brake pipe adapted to be vented to apply the brakes and an engineer's brake valve connected to said pipe, an automatic brake application mechanism adapted to vent the brake pipe, means for automatically controlling said mechanism, means normally requiring a complete manual restoring operation for returning said mechanism to normal non-venting condition after being automatically actuated, means for rendering the engineer's brake valve ineffective to control the brakes, and means for rendering said mechanism ineffective to control the brakes, and means for rendering said mechanism ineffective to vent the brake pipe after the engineer's brake valve has been rendered inoperative and an incomplete restoring operation of the second mentioned means has been effected.

21. In combination with the pneumatic braking equipment of a train, said equipment having a brake pipe adapted to be vented to apply the brakes, an automatic brake application mechanism adapted to effect venting of the brake pipe, means comprising a device requiring a completed restoring operation for returning said mechanism to normal non-venting condition after an automatic actuation, and means effective only after an incomplete restoring operation of said device has been made for rendering said mechanism inoperable to vent the brake pipe.

22. In combination with the pneumatic braking equipment of a train, said equipment including an engineer's brake control valve, a double heading device for rendering said valve inoperable to effect a brake application, means for effecting an automatic brake application, another manually operable device in addition to said engineer's valve, said latter device being associated with said means, and means correlating both said devices whereby both said devices must be manually operated to effect a change from normal to double heading operation.

23. In a train control system, primary responsive means operable automatically from a normal to an actuated condition, secondary means actuable for controlling train movement, said secondary means being actuated from normal to actuated condition in response to actuation of said primary responsive means and being adapted to remain in actuated condition until restored, and restoring means for effecting successive restoration of first said primary and then said secondary means to normal condition.

24. In a train control system, primary responsive means operable automatically from a normal to an actuated condition, secondary means actuable for controlling train movement, said secondary means being actuated from normal to actuated condition in response to actuation of said primary responsive means and being adapted to remain in actuated condition until restored, and restoring means for effecting successive restoration of both said primary and secondary means, said restoring means including a member movable from a normal position to effect restoration of the primary means while the secondary means continues in actuated condition, and capable of being returned to normal position to effect restoration of the secondary means to normal condition.

25. In combination with the braking equipment of a train, said equipment including a brake pipe adapted to be vented to apply the brakes, a control valve adapted to be actuated from normal to actuated condition in response to a track impulse and to remain in actuated condition until restored, a secondary means including a pneumatic brake valve having pneumatic connection with the control valve, said brake valve being actuated from a normal condition in response to actuation of the control valve to vent the brake pipe and being adapted to remain in brake pipe venting condition until restored, means for restoring said valves to normal condition, and means for preventing restoration of said brake valve except when said control valve is in normal condition.

26. In a train control system, primary responsive means operable automatically from a normal to an actuated condition, secondary means actuable for controlling train movement, said secondary means being actuated from normal to actuated condition in response to actuation of said primary responsive means and being adapted to remain in actuated condition until restored, means for restoring said primary and secondary responsive means to normal condition, and means for preventing actuation of said secondary responsive means to normal condition except when said primary responsive means is in normal condition.

In testimony whereof, I have hereunto set my hand.

HOWARD S. FOLKER.